(United States Patent Office — 2,788,339 — Patented Apr. 9, 1957)

2,788,339

FILM-FORMING SOLID POLYEPOXY COPOLYMERS OF ALLYL GLYCIDYL ETHER AND VINYL ACETATE

Henry S. Rothrock, Wilmington, Del., and William K. Wilkinson, Waynesboro, Va., assignors to E. I. du Pont de Nemours and Company, Wilmington, Del., a corporation of Delaware No Drawing. Application March 11, 1954, Serial No. 415,682

1 Claim. (Cl. 260—85.7)

This invention relates to polymeric materials and to their preparation. More particularly, it relates to novel copolymers of vinyl acetate containing epoxide oxygen and to methods of preparing them.

This application is a continuation-in-part of our application Serial No. 218,884, filed April 2, 1951, and now abandoned.

Polyepoxides, that is polymers containing oxygen in the form of 1,2-epoxy units

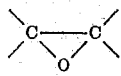

also called oxirane units, until recently have been comparatively little known and their technical usefulness has been limited. While a copolymer of allyl glycidyl ether and vinyl acetate has been briefly mentioned in the patent literature (Shokal et al. Patent 2,585,506), there is no disclosure that within a specific range of allyl glycidyl ether content copolymers of allyl glycidyl ether and vinyl acetate would possess properties making them eminently suitable in themselves as film-forming ingredients of coating compositions.

It has recently been found (application Ser. No. 295,127, filed by M. E. Cupery on June 23, 1952), that polyepoxides can be reacted with ammonia or primary and secondary amines to give polyamines of considerable technical importance. It has also recently been shown, e. g., in U. S. Patent 2,562,897, issued to E. K. Ellingboe on August 7, 1951, that certain polyepoxy polymers give outstanding thermosetting compositions for use in coatings. The new copolymers of this invention are specifically adapted for these uses, as well as for many others.

It is an object of this invention to provide novel solid polyepoxy copolymers containing allyl glycidyl ether and vinyl acetate within certain proportions, and methods for their preparation. A further object is to provide new solid polyepoxy copolymers of allyl glycidyl ether and vinyl acetate having desirable thermosetting properties and useful in various coating applications. A still further object is to provide solid polyepoxy copolymers of allyl glycidyl ether and vinyl acetate which are soluble in common organic solvents and useful as the film-forming ingredients of coating compositions. Other objects will appear hereinafter.

The objects of this invention are accomplished by providing solid polyepoxy copolymers of allyl glycidyl ether and vinyl acetate having a molecular weight of above 1000 and consisting of from about 3% to about 30% by weight of polymerized allyl glycidyl ether and from about 70% to about 97% by weight of polymerized vinyl acetate, these solid copolymers having the additional characteristic of being soluble in common organic solvents. These polymers are obtained by heating together in a homogeneous, one-phase system in the presence of a free radical-producing polymerization initiator and at a temperature above about 60° C., a mixture of monomeric allyl glycidyl ether and monomeric vinyl acetate containing from about 3% to about 40% by weight of allyl glycidyl ether and from about 97% to 60% by weight of vinyl acetate.

The polymerization is preferably carried out in the absence of a solvent or in the presence of an organic solvent which is essentially inert under the polymerization conditions. Polymerization of the monomers in aqueous systems is generally not preferred because the resulting copolymers thus prepared are often insoluble in the common organic solvents, indicating that crosslinking or other reactions of the epoxide groups may have occurred.

Free radical-producing initiators cause polymerization of the allyl glycidyl ether solely through the unsaturated (allyl) linkages, leaving the epoxy group unaffected. Thus, the products of this invention are linear copolymers consisting of units

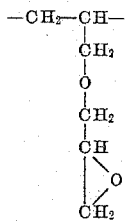

resulting from the addition polymerization of the unsaturated portion of the allyl glycidyl ether molecule, and of units

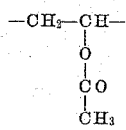

resulting from the addition polymerization of vinyl acetate. Since the epoxy group of monomeric allyl glycidyl ether is retained unchanged in the copolymer, the amount of polymerized allyl glycidyl ether present can be readily determined by analyzing the copolymer for oxirane oxygen, according to known methods.

The invention is illustrated in greater detail by the following examples, in which parts are by weight.

Example I

A solution of 30 parts of allyl glycidyl ether, 70 parts of vinyl acetate and 1 part of alpha,alpha'-azodiisobutyronitrile in 130 parts of benzene was heated at 80° C. for 7 hours. Removing the benzene by distillation left 36 parts of a solid copolymer of allyl glycidyl ether and vinyl acetate. The copolymer had an oxirane oxygen content of 3.5%, corresponding to 25% by weight of allyl glycidyl ether.

Example II

A solution consisting of 540 parts of vinyl acetate, 60 parts of allyl glycidyl ether, 30 parts of isopropyl ether and 18 parts of benzoyl peroxide was heated rapidly to a temperature of about 77° C. From this point on the exothermic polymerization reaction continued at the reflux temperature of the mixture without external heating. The internal temperature was maintained below 85° C. by the gradual addition of 28 parts of acetone and moderate cooling of the reaction vessel over a period of about 15 minutes. When the refluxing had subsided, heat was applied gradually for an additional hour to maintain the solution temperature at 75–77° C. An additional 55 parts of acetone was then added to lower the viscosity of the solution. The final solution contained 76.3% by weight of allyl glycidyl ether/vinyl acetate copolymer. The conversion of monomers to copolymer was 88% of the theory. The copolymer contained 1.47% oxirane oxygen, corresponding to 10.4% by weight of polymerized allyl glycidyl ether (a mole ratio of allyl glycidyl ether to vinyl acetate of 1:11.3) and to an oxirane equivalent weight of 1088, that is a molecular weight of 1088 per oxirane oxygen atom. The copolymer had a molecular weight of 5500 and a 50% solution of it in dioxane had a viscosity of 3.2 poises at 25° C. Upon evaporation of the solvent, the polymeric epoxide was obtained as a colorless, tough resin softening at 50-60° C.

Example III

A solution consisting of 430 parts of vinyl acetate, 114 parts of allyl glycidyl ether, 81.6 parts of anhydrous isopropanol and 21.7 parts of benzoyl peroxide was heated rapidly to 69° C. and then allowed to reflux slowly under the heat of the exothermic polymerization reaction. After about one hour, when a solution temperature of about 77° C. was reached, heat was again applied gradually to maintain a slow reflux. Three hours later, examination of a sample removed from the solution indicated 80% conversion. After heating for an additional 1½ hours at 80–82.5° C., polymerization was 86% complete. The residual monomers and solvent were removed by distillation under 16 mm. mercury pressure at 90–100° C., then isopropanol was added to the polymer in sufficient amount to give a solution containing 75% by weight of the copolymer. This solution had a viscosity of about 18.8 poises at 25° C. The allyl glycidyl ether/vinyl acetate copolymer of this example had a molecular weight of about 1400 and contained 3% oxirane oxygen, corresponding to 21.3% by weight of polymerized allyl glycidyl ether (a mole ratio of allyl glycidyl ether to vinyl acetate of 1:4.9) and to an oxirane equivalent weight of 533.

Example IV

A solution of 258 parts of vinyl acetate, 114 parts of allyl glycidyl ether and 15 parts of di-tertiary butyl peroxide was heated under nitrogen atmosphere in a pressure vessel at 130–135° C. for 6 hours. The residual monomers were removed by evaporation at 75–80° C. under 0.1 mm. pressure. The allyl glycidyl ether/vinyl acetate copolymer so obtained contained 3.7% oxirane oxygen, corresponding to 26.3% by weight of polymerized allyl glycidyl ether (a mole ratio of allyl glycidyl ether to vinyl acetate of 1:3.7) and to an oxirane equivalent weight of 432. The product was a colorless, tough resin softening at 40–50° C. It was soluble in alcohol, acetone, benzene and in many other solvents but insoluble in petroleum ether.

Example V

A solution comprising 950 parts vinyl acetate, 50 parts allyl glycidyl ether, 150 parts dioxane and 10 parts benzoyl peroxide was heated with agitation to 79° C., at which temperature it refluxed rapidly. The heating was discontinued and the solution allowed to reflux slowly under the heat of the exothermic polymerization reaction. After about 20 minutes, the solution temperature reached 87° C. At this point, 150 parts of dioxane was added over a period of about 2 minutes, lowering the solution temperature to 84° C. After about 10 minutes the solution temperature reached 89° C. and foaming of the viscous solution was noted. Upon addition of 79 parts isopropanol the foaming subsided and the solution temperature was lowered to about 80° C. The temperature gradually increased due to the exothermic polymerization to 86° C. over a period of about one-half hour. The temperature then began to decrease and slight heating was applied over a period of one and one-half hours to maintain a solution temperature of 80 to 85° C. At this point the solution contained 68% polymer solids, indicating about 94% conversion of monomers to polymer. To this viscous mass was added 211 parts of dioxane. Upon heating with stirring, 100 parts of solvent containing 25.3% vinyl acetate was distilled from the polymerization solution. The final solution of the copolymer contained 64% solids and had a viscosity of about 200 poises. The polymeric epoxide contained 0.62% oxirane oxygen, corresponding to 4.4% of allyl glycidyl ether, and had a molecular weight of 7000.

Films of the polymer air dried on glass plates were colorless, moderately hard, tack-free, and had good toughness. The polyepoxide was highly soluble in organic solvents such as acetone, alcohols, benzene, and chlorinated hydrocarbons.

The criticality of an allyl glycidyl ether content of not more than 30% in the copolymer is illustrated by the following comparative tests:

Several monomer mixtures, identified by the numbers 1 to 6 in the tables below, were prepared with an allyl glycidyl ether content increasing from 10 to 90% by weight and a vinyl acetate content correspondingly decreasing from 90 to 10%. These monomer mixtures were all polymerized under identical conditions as follows: the monomer mixtures were dissolved in benzene at 50% concentration, 2% of benzoyl peroxide based on the weight of the monomers was added, and the mixture was heated for 2 hours at 75° C., then for 2 hours at 85° C. In all cases, the copolymers were isolated by precipitation from the solution with petroleum ether, washing with petroleum ether, redissolving in benzene and again precipitating and washing with petroleum ether. The purified polymers were then dissolved in benzene and a portion of the solvent was distilled to remove any residual petroleum ether.

The allyl glycidyl ether content and molecular weight of these copolymers, shown in Table A below, were determined on samples isolated from the final benzene solution by evaporation of the solvent followed by warming the residue for 2 hours at 60° C. under a pressure of less than 1 mm. of mercury. Likewise, the film properties given in Table A were determined on films cast from the final benzene solution, air-dried and warmed for 2 hours at 60° C. under a pressure of less than 1 mm. of mercury. The solution viscosities were determined on the benzene solutions, adjusted to the stated solids concentration, at 25° C. In the table below, the abbreviations VAc and AGE refer to vinyl acetate and allyl glycidyl ether, respectively.

TABLE A

| Mixture | Monomer Ratio | | Percent Conversion to Copolymer | Percent AGE in Copolymer | Molecular Weight | Percent Solids/ Viscosity in Poises | Film Properties |
| --- | --- | --- | --- | --- | --- | --- | --- |
| | VAc | AGE | | | | | |
| 1 | 90 | 10 | 56 | 8.7 | 6,500 | 45/0.65 | Hard, tough. |
| 2 | 80 | 20 | 43 | 13.7 | 2,800 | 45/0.35 | Do. |
| 3 | 70 | 30 | 17 | 25.3 | 2,000 | 50/0.10 | Slightly soft, pliable. |
| 4 | 60 | 40 | 12 | 34.1 | 1,800 | 50/0.06 | Soft, tacky. |
| 5 | 50 | 50 | 8 | 43.3 | 1,040 | 50/0.005 | Very soft, sticky. |
| 6 | 10 | 90 | 5 | 61.4 | 570 | 50/very low | Liquid, very sticky. |

It will be apparent from the above data that the last three polymers, that is, those having an allyl glycidyl ether content of 34% and above, give films whose physical properties make them unsuitable for use in coating or impregnating applications. On the other hand, the first three polymers listed are well suited for such applications. The dividing line between satisfactory and unsatisfactory copolymers is at an allyl glycidyl ether content of about 30%.

It will also be apparent that the conversions of monomers to polymers become very low at about the same point. While it is possible to obtain higher conversions throughout the range by appropriate changes in the procedure, e. g., by increasing the amount of polymerization initiator, the fact remains that, for a given set of polymerization conditions, conversions are very poor above an allyl glycidyl ether content of about 30%.

The differences in properties between copolymers containing less than about 30% of allyl glycidyl ether and those containing more than that amount are even more strikingly shown by the following tests of hardness, flexibility, toughness, tack and resistance to chemical agents, carried out on films of the same copolymers 1 to 5 (the sixth one does not form a solid film), after curing these films by heating them with or without curing agents. With each of these five copolymers, four curing procedures were carried out as follows:

A. m-Benzenedisulfonic acid, 0.25 equivalent per oxirane equivalent, was added as a 2% dioxane solution to the benzene solution of the copolymer. A film was cast, air-dried, then heated in air at 110° C. for 30 minutes.

B. Diethylenetriamine, 0.33 equivalent per oxirane equivalent, was added as a 10% benzene solution to the benzene solution of the copolymer. A film was cast, air-dried, then heated in air at 120° C. for 30 minutes.

C. Phosphoric acid, 2% $H_3PO_4$ based on polymer solids, was added as 10% dioxane solution to the benzene solution of the copolymer. A film was cast, air-dried, then heated in air at 120° C. for 45 minutes.

D. No curing catalyst was used. A film was cast from the benzene solution, air-dried, then heated in air at 120° C. for 30 minutes.

Table B below summarizes the properties of these cured films. The following abbreviations are used to represent some of the properties shown:

*Pencil hardness.*—H=good hardness; 2H–5H=hard, increasing to very hard; B–F=fair hardness; 2B–4B=soft films.

*Flexibility and toughness.*—E=excellent; G=good; F=fair; S=too soft to measure satisfactorily.

*Resistance to chemicals.*—0=soluble; 3=partly soluble; 5=insoluble but severe swelling; 7=softening, appreciable swelling; 8=some softening, slight swelling; 9=slight softening, no swelling; other values represent intermediate degrees of resistance.

TABLE B

FILMS OF COPOLYMER 1 CONTAINING 8.7% AGE

| Catalyst | Pencil Hardness | Flexibility | Toughness | Tack | Resistance to—[1] | | |
|---|---|---|---|---|---|---|---|
| | | | | | Water | 3% HOAc | 1% $Na_2CO_3$ |
| A | 4H | G | E | none | 9+ | 9 | 9 |
| B | 4H | G | E | do | 9 | 9 | 9 |
| C | 5H | G | E | do | 9 | 9 | 9 |
| D (none) | 2H | F | F | do | 9 | 9 | 9 |

FILMS OF COPOLYMER 2 CONTAINING 13.7% AGE

| A | 2H | G | E | none | 9 | 9 | 9 |
| B | 2H | G | E | do | 9 | 9 | 9 |
| C | 4H | G | E | do | 9 | 9 | 9 |
| D (none) | H | F | F | do | 9 | 9 | 9 |

FILMS OF COPOLYMER 3 CONTAINING 25.3% AGE

| A | B | G | E | none | 7 | 7 | 7 |
| B | H | G | E | do | 7 | 7 | 8 |
| C | F | F | G | do | 9− | 9− | 9− |
| D (none) | 4B | S | S | slight | 8 | 8 | 8 |

FILMS OF COPOLYMER 4 CONTAINING 34.1% AGE

| A | 3B | S | S | slight | 5 | 6 | 6 |
| B | 3B | S | S | do | 5 | 0 | 8 |
| C | B | F | F | do | 7 | 7 | 7 |
| D (none) | S | S | S | severe | 5 | 5 | 5 |

FILMS OF COPOLYMER 5 CONTAINING 43.3% AGE

| A | 4B | S | S | severe | 5 | 5 | 5 |
| B | 4B | S | S | do | 5 | 0 | 8 |
| C | 2B | G | F | slight | 7 | 7 | 7 |
| D (none) | S | S | S | severe | 4 | 4 | 4 |

[1] Films in contact with respective agents for 15 minutes at room temperature.

Again it will be apparent that the general level of properties of the cured films decreases sharply from the third to the fourth copolymer composition, i. e., at about a 30% content of polymerized allyl glycidyl ether in the copolymer.

The remarkable modifying effects produced by the presence in polyvinyl acetate of even a very small amount of polymerized allyl glycidyl ether are shown by the following tests in which a vinyl acetate/allyl glycidyl ether copolymer containing only 3.14% of polymerized allyl glycidyl ether was compared with a vinyl acetate homopolymer prepared under identical conditions. It will be seen that films from the respective polymers exhibit marked differences from the standpoint of resistance to both organic solvents and water as to the films subjected to a curing treatment, and from the standpoint of stability towards acidic agents. The desirable properties imparted to polyvinyl acetate by the presence of polymerized allyl glycidyl ether units are definitely achieved with as little as about 3% by weight of polymerized allyl glycidyl ether, although improvements may become noticeable even with somewhat smaller amounts.

A copolymer of vinyl acetate with a low amount of allyl glycidyl ether was prepared by heating, at 75° C. for 2 hours and then at 85° C. for 2 hours, a solution comprising 76.8 parts vinyl acetate, 3.2 parts allyl glycidyl ether, 100 parts dioxane, 20 parts isopropyl alcohol, and 1.6 parts benzoyl peroxide. The conversion of monomers to copolymer was 72% of theory. The product was purified by precipitation with petroleum ether and washing several times, followed by redissolution in dioxane and again precipitating and washing with petroleum ether. The copolymer was then dissolved in dioxane and the residual petroleum ether removed by distillation under reduced pressure. The final dioxane solution had 52.6% copolymer solids and a viscosity of 1.4 poises at 25° C. The copolymer upon analysis showed 0.44% oxirane oxygen content, which is equivalent to 3.14% allyl glycidyl ether.

For comparison a vinyl acetate homopolymer was prepared by the identical procedure as above, using a solution comprising 80 parts vinyl acetate, 100 parts dioxane, 20 parts isopropyl alcohol, and 1.6 parts benzoyl peroxide. A solution of this homopolymer, after purification as outlined above, at 52.7% solids in dioxane had a viscosity of 1.5 poises at 25° C.

In the presence respectively of 0.1% boron trifluoride and of 0.1% phosphoric acid, films of the copolymer were readily cured after heating at 120° C./30 min. to become insoluble in solvents such as dioxane and ethanol while films of the homopolymer containing the same catalysts and heated under identical conditions did not cure, i. e., remained soluble in these solvents. Upon immersion in water, films of the cured copolymer remained colorless and clear whereas films of the homopolymer given identical treatment whitened rapidly. This demonstrates the superior water resistance of the cured copolymer over the similarly treated homopolymer.

When about 0.03% m-benzenedisulfonic acid, based on polymer weight, was added to both copolymer and homopolymer and films of these compositions were heated at 100° C. for 30 minutes, the homopolymer films became severely discolored while the copolymer films remained clear and colorless. This demonstrates the stabilizing action towards acidic materials resulting from the presence of a small amount of allyl glycidyl ether in polymerized vinyl acetate.

The copolymers of this invention contain, by weight, between about 3% and about 30% of polymerized allyl glycidyl ether and between about 70% and about 97% of polyvinyl acetate. The most useful copolymers from the standpoint of film properties are in general those which contain between about 5% and 25% of polymerized allyl glycidyl ether and between about 75% and 95% of polyvinyl acetate. The compositions may also comprise various extraneous nonpolymerizable adjuvants such as dyes, pigments, reinforcing agents, fillers, plasticizers, stabilizers, oils, resins, etc.

The copolymers of this invention are prepared by polymerizing together and in suitable proportions vinyl acetate and allyl glycidyl ether. When the proportion of the latter is low, e. g., up to about 20% by weight of the monomeric materials, and particularly when a solvent is present in the polymerization mixture, it polymerizes at about the same rate as the vinyl aceate, so that the copolymer has about the same composition as the monomer mixture. With higher proportions, above about 20%, of monomeric allyl glycidyl ether, and particularly in the absence of a solvent, it is found that the vinyl acetate has a tendency to polymerize somewhat faster than the allyl glycidyl ether and, therefore, to appear in the polymer in slightly greater proportion than in the monomeric mixture. As a general rule, copolymers within the desired range of proportion of the two components are obtained from monomer mixtures containing, by weight from 3% to 40% (preferably from 5% to 30%) of allyl glycidyl ether and from 60% to 97% (preferably from 70% to 95%) of vinyl acetate. The fact that vinyl acetate and allyl glycidyl ether copolymerize in approximately the composition of the monomer mixture is very surprising for allyl compounds. It was not to be expected since, in copolymerizing allyl glycidyl ether with other monomers, it is necessary to maintain a high excess of allyl glycidyl ether monomer in order to obtain a copolymer containing appreciable amounts of allyl glycidyl ether. This makes it difficult to obtain homogeneous polymers. This difficulty is minimized to an unexpected degree with the comonomer systems of this invention.

As has already been indicated, it is necessary to have in the copolymer a sufficient amount of allyl glycidyl ether, which for practical purposes is in the neighborhood of 3% by weight, to furnish sufficient epoxy groups for good crosslinking with curing agents. The amount of allyl glycidyl ether should not exceed about 30% by weight for the reason that allyl glycidyl ether has a softening effect on the polymer, which effect becomes quite pronounced at about the upper limit stated.

The polymerization initiators suitable for the preparation of these copolymers are the organic solvent-soluble initiators of the free radical-generating types such as peroxides, e. g., benzoyl peroxide, lauroyl peroxide, tert.-butyl hydroperoxide, diethyl peroxide, and the like; or the azo compounds described in U. S. Patent 2,471,959, e. g., the azonitriles such as alpha, alpha'-azodiisobutyronitrile; alpha,alpha'-azobis-(alpha,gamma-dimethylvaleronitrile); dimethyl alpha,alpha'-azodiisobutyrate; 1,1'-azodicyclohexanecarbonitrile and the like. The catalyst need be used only in minor amounts, e. g., between 0.1 and 5% based on the weight of the total polymerizable materials. With azonitrile catalysts, a preferred amount is between 0.5 and 1.5%, based on the total polymerizable materials.

The polymerization can be carried out without any extraneous solvent, particularly when the proportion of allyl glycidyl ether in the monomer mixture is rather high, e. g., 20% or more. When lower amounts of allyl glycidyl ether are involved, it is desirable, although not essential, to use an organic solvent in order to facilitate control of the exothermic reaction. Any inert, unpolymerizable organic solvent can be used, including aromatic hydrocarbons such as benzene, toluene, or the xylenes; ketones such as acetone, methyl isobutyl ketone, cyclohexanone; alcohols such as methanol, ethanol, isopropyl alcohol, n-butanol, tertiary butyl alcohol; ethers such as isopropyl ether, di-n-butyl ether; and the like. Solvents which are active chain-transfer agents such as isopropyl alcohol tend to lower the molecular weight of the copolymer produced and have special usefulness when this is desired. The amount of solvent, when a solvent is used, may vary between about 10% and about 100% of the total weight of the monomers. In general, it has been found desirable to use less than 50% of solvent, and preferably from 10% to 20%, based on the total weight of the monomers used. In some cases, the polymerization is conveniently started without solvent and a solvent, in amounts, for example of 10% to 30% by weight, is added during the final stage of the polymerization, to facilitate control of the exothermic reaction or to soften or dissolve the copolymer so that it can be handled satisfactorily.

Because allyl glycidyl ether has a desirable moderating influence on the polymerization of vinyl acetate, copolymerization in bulk or with very small amounts of solvent added can be carried out at easily controllable rates. This is another unexpected advantage of the systems of this invention since, in the case of unmodified vinyl acetate or of most other monomers, bulk polymerization is difficult to control. Since it is unnecessary with allyl glycidyl ether/vinyl acetate copolymers to use solvents in more than minor quantities, these copolymers offer great advantages in manufacture because the problems of solvent removal and of size of equipment are minimized.

The polymerization system should preferably not contain an aqueous phase distinct from the organic phase. Particularly if high polymerization temperatures (e. g., 75° or higher) are used, there should be substantially no water present to avoid side reactions. As indicated previously, polymerization in bulk or in the presence of non-reactive organic solvents is preferred.

The reaction temperature is not critical, except to the extent that it may tend to affect the molecular weight of the polymer. As a general rule, an increase in polymerization temperature with a given initiator and a given vinyl acetate/allyl glycidyl ether ratio tends to decrease the molecular weight of the resulting polymer. It is usually expedient to operate at temperatures above 60° C. and preferably between 75 and 95° C. However, higher temperatures, e. g., up to 150° C. or even up to the decomposition point of the reactants, can be used. At the lower range of temperatures, the reaction is conveniently carried out in open vessels under reflux, but, particularly at higher temperatures, it can be carried out in closed vessels under the autogenous pressure of the reactants, and additional pressure can be applied if desired. As already noted, the polymerization reaction is exothermic and it is often desirable to control it by external cooling of the reaction vessel. Conversions of monomer to polymer can be very high when using low amounts, e. g., up to 20%, of allyl glycidyl ether, and it is usually possible to polymerize 75–99% of the monomers at temperatures above 75° C.

The copolymers of this invention are colorless or light colored products varying in appearance from relatively low softening solids to hard, tough solids, depending upon their molecular weight and composition. Their molecular weight is generally above 1000 and preferably between 2000 and 10,000. They have the advantage of ready solubility in most organic solvents. These polymers may be cured, that is, rendered insoluble in the same solvents, by means of a heat treatment at temperatures between about 120° C. and 250° C. for periods varying, depending on the temperature, between 10 and 45 minutes. However, the heat-curing or thermosetting of the resins is preferably carried out with the aid of small amounts, from 0.1 to 2% by weight, of curing or thermosetting agents. These agents, which are believed to bring about crosslinking through the glycidyl side groups, may be acidic materials such as zinc chloride, butyl acid phosphate, amine hydrochlorides, sodium or barium ethylsulfate, boric acid, citric acid, phosphoric acid, phosphomolybdic acid, phthalic anhydride, phthalic acid, oxalic acid, benzenesulfonic acids, boron trifluoride and the like.

A preferred curing agent is a combination of stannous chloride and citric acid, used in ratios of between about 0.1–0.3% of tin (as $SnCl_2 \cdot 2H_2O$) and about 0.5–2% of citric acid. Curing may also be achieved through the use of polyamines such as hexamethylenediamine, decamethylenediamine, diethylenetriamine and di-(p-aminophenyl) methane or with hexamethylenetetramine, and the like. With the help of such agents, it is possible to insolubilize the resins at lower temperatures, for example by heating at 100 to 175° C. for 10 to 30 minutes or alternatively at higher temperatures, such as 140–250° C., but in less time than is possible at the same temperature without a curing agent. After complete curing, the resins are substantially insoluble in and unaffected by the common solvents. The allyl glycidyl ether/vinyl acetate copolymers cure more readily, show greater physical changes, and require lower proportions of allyl glycidyl ether for these effects than other allyl glycidyl ether copolymers.

The above-described thermosetting properties make the polymers of this invention particularly useful in the coating and impregnating of porous surfaces such as textiles, e. g., cotton fabrics or regenerated cellulose fabrics, paper, wood, brick, etc., and in the coating of nonporous surfaces such as iron, steel, glass, and the like. They are also useful in such applications as wire coating and can coating, and the preparation of molded and extruded articles, adhesives, unsupported films, fibers, etc.

The allyl glycidyl ether/vinyl acetate copolymers of this invention are further useful in their ability to react with phosphoric acid, in amount exceeding that which produces cross-linking, i. e., at least one-half mole of acid per oxirane oxygen, to yield polymeric phosphate soluble in dilute aqueous ammonium hydroxide. These polymeric phosphates are further described and claimed in patent application of M. E. Cupery, Ser. No. 345,233, filed on March 27, 1953, and are of great technical value in many aplications, e. g., as finishes, adhesives, textile sizes, leather treating agents and paper treating agents.

As many apparently widely different embodiments of this invention may be made without departing from the spirit and scope, thereof, it is to be understood that this invention is not limited to the specific embodiments thereof except as defined in the appended claim.

We claim:

A solid polyepoxy copolymer of allyl glycidyl ether and vinyl acetate having a molecular weight of above 1000 and consisting essentially of from 3% to 30% by weight of polymerized allyl glycidyl ether and from 97% to 70% by weight of polymerized vinyl acetate.

References Cited in the file of this patent

UNITED STATES PATENTS 2,585,506     Shokal et al. _____ Feb. 12, 1952